Patented Apr. 25, 1944

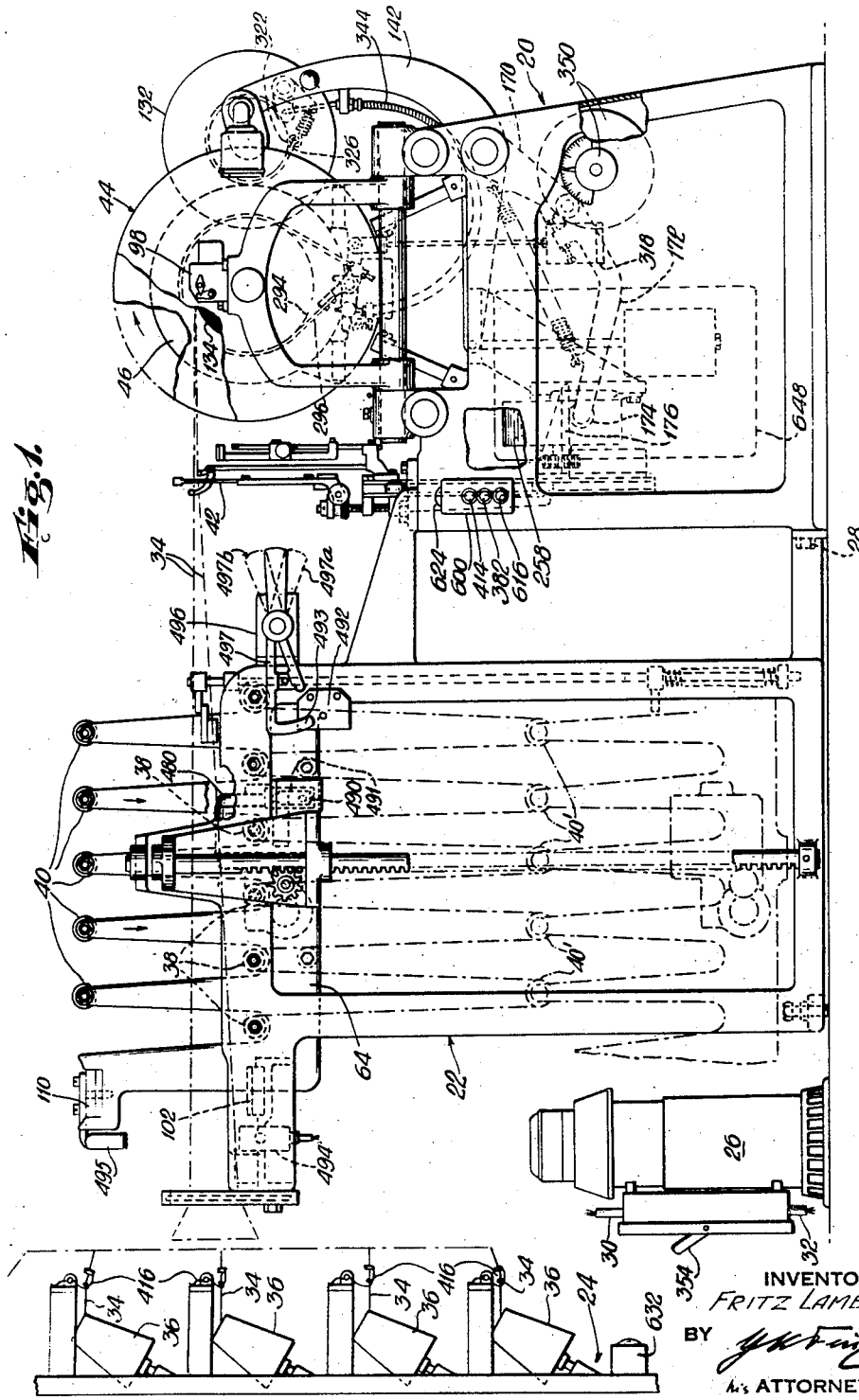

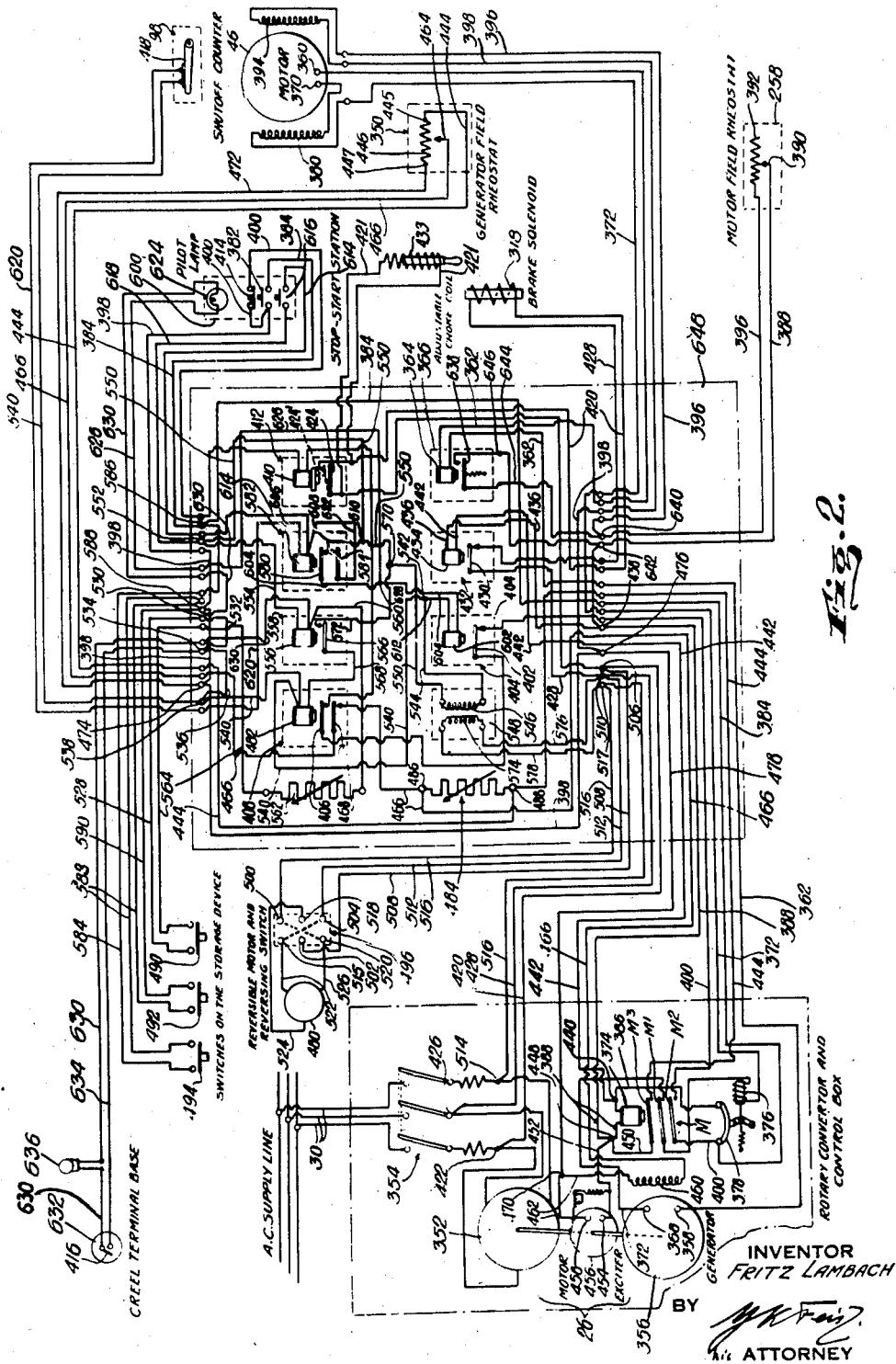

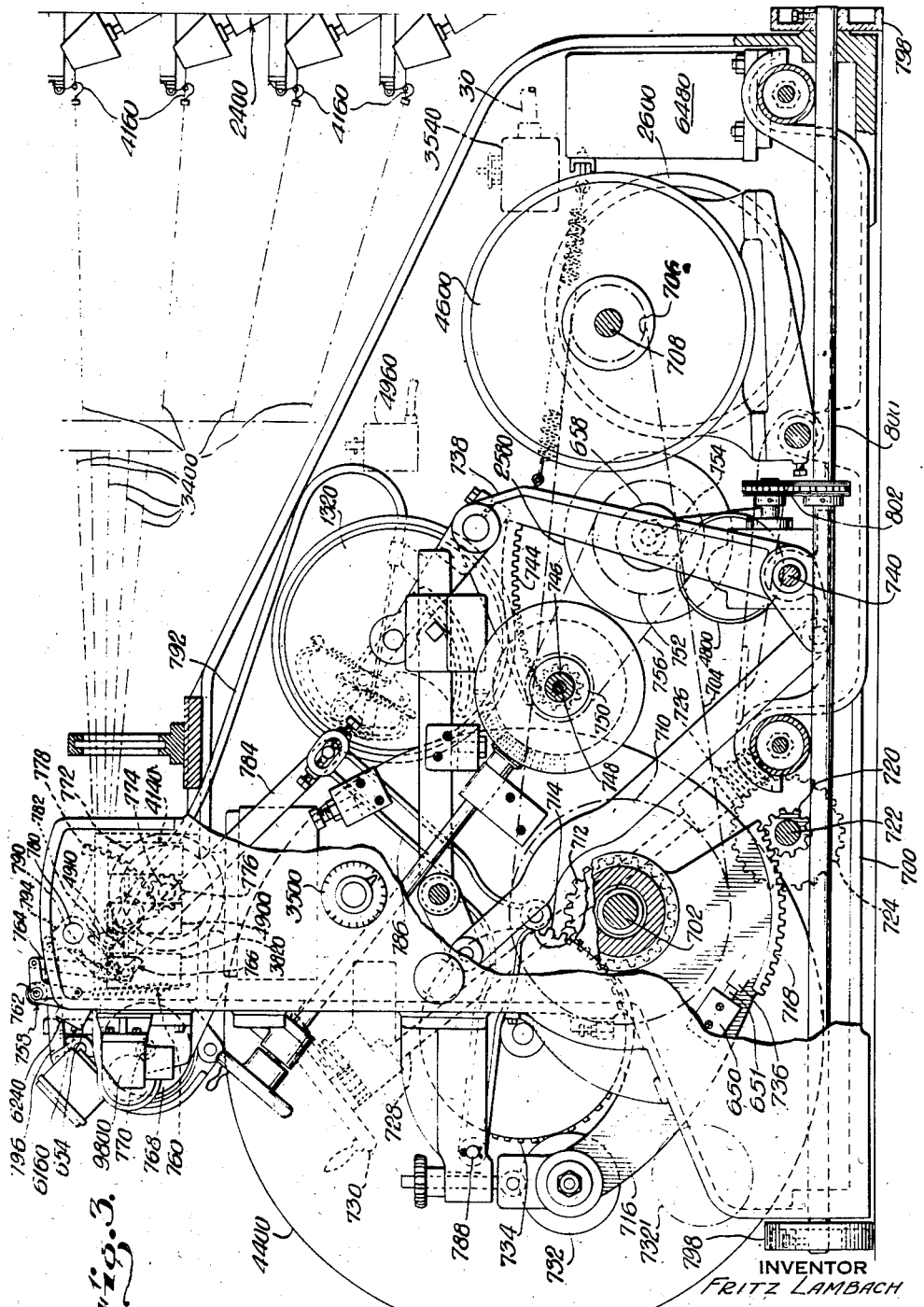

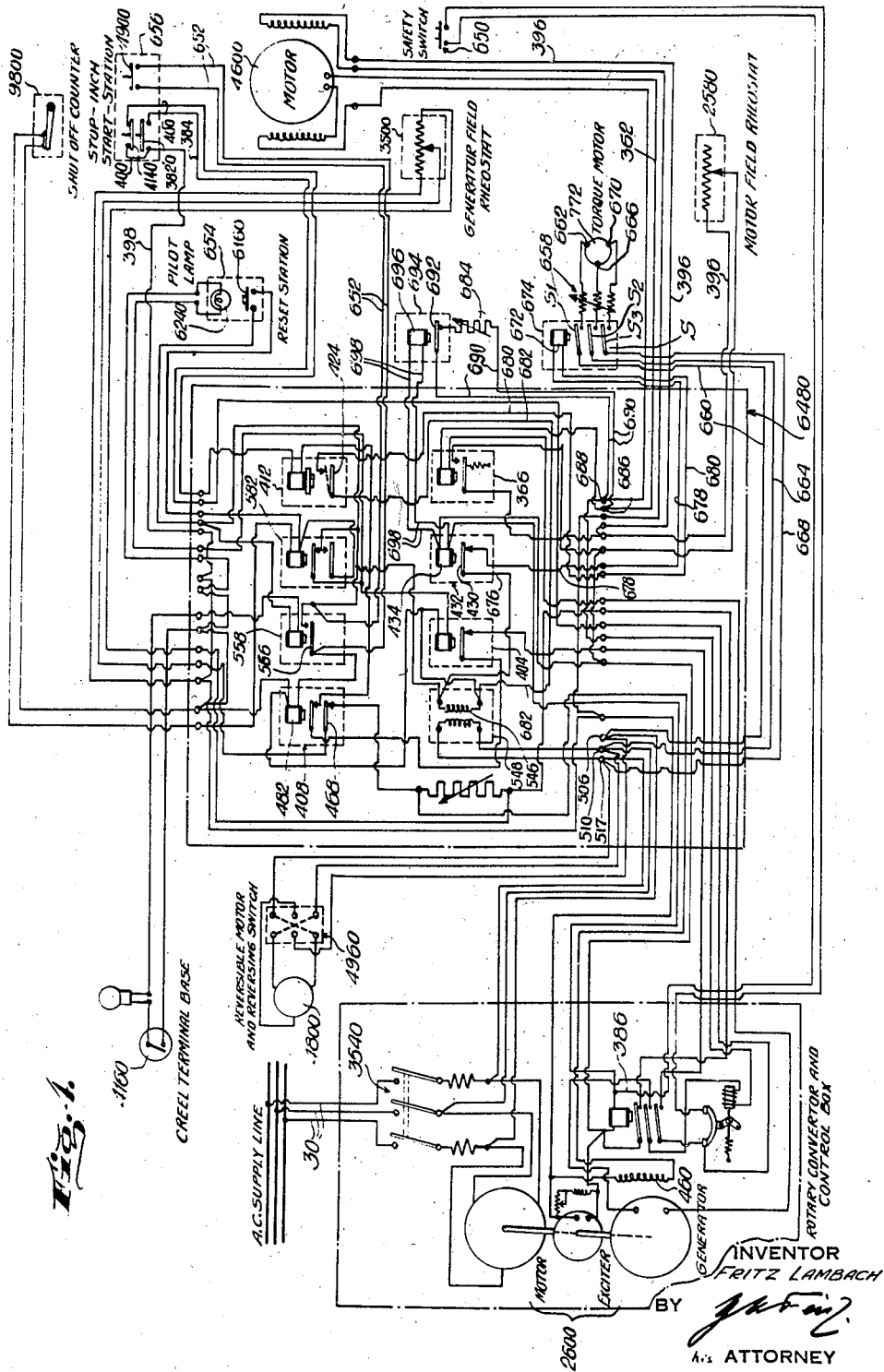

2,347,198

UNITED STATES PATENT OFFICE 2,347,198

ELECTRICAL CONTROL SYSTEM FOR THE OPERATION OF BRAKING MEANS OF WARPING OR BEAMING PLANTS

Fritz Lambach, Tenafly, N. J.

Original application November 21, 1941, Serial No. 419,832. Divided and this application November 2, 1942, Serial No. 464,228

36 Claims. (Cl. 28—51)

This application is a divisional application divided out of my copending patent application Serial #419,832, filed on November 21, 1941, for an Electrical control system for a warping or beaming plant.

My invention relates to an electrical control system for textile machines, and more particularly to an electrical control system for a warping or beaming plant.

One object of my invention is to improve upon the electrical control of warping or beaming plants as now ordinarily made.

My invention consists in certain novel features of an electrical control system as will be fully described hereinafter.

Further objects and advantages of the invention will be apparent from the following disclosure of several embodiments thereof.

In the accompanying drawings is:

Fig. 1 an elevational view of a warping plant including a creel, a storage device, a sectional warper and an A. C. to D. C. motor generator set, only the end portion of the creel being shown in the drawings, Fig. 2 a circuit diagram of an electrical control system for the electrical equipment of the warping plant shown in Fig. 1, wherein the switches are shown in their normal position when the relays are deenergized, Fig. 3 an elevational view, partly in section, of a different embodiment of a beaming plant including a creel and a beamer comprising an A. C. to D. C. motor generator set, only the end portion of the creel being shown in the drawing, and Fig. 4 a different embodiment of a circuit diagram of an electrical control system for the electrical equipment of the beaming plant shown in Fig. 3, wherein the switches are shown in their normal position when the relays are deenergized.

Referring now to Fig. 1, 20 generally indicates a warper, 22 generally indicates a so-called storage device, 24 generally indicates a creel, and 26 generally indicates an A. C. to D. C. motor generator set. The storage device 22 is connected with the warper 20 by means of screws 28. The creel 24 is arranged at a suitable distance from the storage device. The A. C. to D. C. motor generator set 26 is supplied with alternating current from an electrical source (not shown) through the line 30 and delivers direct current to the various electrical equipments of the warping plant through a multiple conductor cable 32.

During the normal operation of the warping plant, the warp yarns 34 travel from the bobbins 36 mounted in the creel through the space between a stationary gripping means 38 and a movable gripping means 40 of the storage device 22 and thence through a reed 42 to a beam 44 inserted into the warper 20 and driven by a D. C. electromotor 46 mounted on the frame of the warper.

The storage device 22 may be used for a temporary unwinding of a portion of the warp 34 from the beam 44 in case of breakage of yarn at a point between the creel and the beam. For this purpose, the movable gripping means 40 may be displaced by a reversible A. C. motor 480 mounted thereon and controlled by a reversing switch 496 from its inactive position shown in full lines into its active position 40' shown in dash and dot lines. After the broken ends of the yarn or yarns have been tied, the movable gripping means may be returned into its normal inactive position by means of the reversible motor 480.

For a full description of the construction and operation of the storage device 22 and the warper 20 reference is had to my Patent 2,302,700 relating to a "Storage device for a temporary unwinding of a portion of the warp from the beam on a warping or beaming machine," issued on November 24, 1942, and to my Patent #2,324,612, relating to a "Warping or beaming machine," issued on July 20, 1943.

The above described electrical means as well as other electrical means of the warping plant shown in Fig. 1 are arranged in an electrical control system forming the subject matter of my invention. According to the circuit diagram of the electrical control system shown in Fig. 2, the A. C. motor 352 of the A. C. to D. C. motor generator set 26 is supplied with alternating current from an electrical source (not shown) through the lines 30 upon a closing of the hand switch 354. The generator 356 of the A. C. to D. C. motor generator set 26 produces the direct current.

The generator 356 is arranged in the following main motor circuit: The terminal 358 of the generator 356 is connected with the terminal 360 of the D. C. electromotor 46 of the warper through the line 362 including the electromagnet 364 of a motor field vibrating relay 366. The terminal 368 of the generator 356 is connected with the terminal 370 of the electromotor 46 through the line 372 including the pole $M_1$ of the triple-pole main switch M controlled by the trip coil magnet 374, the solenoid 376 of an overload circuit breaker and the series field 380 of the electromotor 46.

As will be apparent from the foregoing, the electromotor 46 of the warper may be started by closing the pole M₁ of the main switch M. This pole M₁ may be closed by an energization of the trip coil magnet 374, which is arranged in the following motor start circuit: A line 384 leads from the right hand terminal of the start push button switch 382 (see right hand portion of Fig. 2) to the left hand terminal of the overload circuit breaker 378, the right hand terminal of which is connected with the trip coil magnet 374 by the line 386. A line 388 leads from the trip coil magnet 374 to the movable finger 390 of an automatic motor field rheostat 258 mounted on the warper 20 and automatically controlled by the movable pressure roll assembly 132, 142 and the controlling mechanism 170, 172, 174, 176 in dependence on the increase of the diameter of the winding 134 on the beam 44 during the operation of the warper as more fully described in my Patent #2,324,612, on July 20, 1943. The coil 392 of the automatic motor field rheostat 258 is connected with one end of the shunt field 394 of the electromotor 46 through a line 396. The other end of the field 394 is connected with the left hand terminal of the start push button switch 382 through a line 398. The start push button 382, which is arranged in the "Stop-start-station" 600 mounted on the frame of the warper 20, is normally held in its open position by the action of a spring (not shown). Current is supplied to above described motor start circuit from the exciter 456 of the A. C. to D. C. motor generator set 26 by means of a line 452 connecting the terminal 454 with a junction point 448 in the line 388 and by means of lines 462 and 478 connecting the terminal 458 with a junction point 476 in the line 398. As soon as the above described motor start circuit is closed by pushing down the start push button 382, the trip coil magnet 374 will be excited for closing the main switch M with its pole M₁, which in turn closes the above described main motor circuit for starting the electromotor 46.

When the trip coil magnet 374 is excited by closing above described motor start circuit by means of the spring loaded start push button 382, the pole M₂ of the main switch M is also closed, whereby a motor start holding circuit including the trip coil magnet of the main switch is closed as will be described hereinafter, so that the main switch remains in closed position upon a subsequent release of the spring loaded start push button. Said motor start holding circuit may be traced as follows starting from the left hand terminal of the start push button switch 382: The line 398, the shunt field 394, the line 396, the automatic rheostat 258, the line 388, the trip coil magnet 374 of the main switch M, the line 386, the bridge of the overload circuit breaker 378, and the line 400 connecting the left hand terminal of the circuit breaker 378 with the left hand terminal of the start push button switch 382, said line 400 including the pole M₂ of the main switch M, the switch 402 of a counter stop relay 404, the switch 406 of a warp brake relay 408, the electromagnet 410 of a time relay 412, and a stop push button switch 414 arranged in the "Stop-start-station" 600 and normally held in closed position by a spring (not shown).

The main switch M is opened and the supply of direct current to the electromotor 46 is interrupted at the pole M₁, as soon as the above described motor start holding circuit including the trip coil magnet 374 is interrupted either at the stop push button switch 414 or at the circuit opening switch 406 of the warp brake relay 408 or at the circuit opening switch 402 of the counter stop relay 404. The opening of the spring loaded stop push button switch 414 takes place when the warper is arrested by hand for any reason whatsoever. The opening of the switch 406 takes place when one or more control needles 416 in the creel drop and close a needle control circuit to be described hereinafter owing to a breakage of yarn, and the opening of the switch 402 takes place when the normally closed switch 418 of a shut off counter 98 arranged on the warper 20 is opened after the performance of a predetermined number of revolutions of the beam as will be described hereinafter.

Any of above mentioned interruptions of the motor start holding circuit causes an energization of a brake solenoid 318 acting on the beam brake 294, 296 and the pressure roll brake 322, 326 coupled with each other by a Bowden wire 344 as more fully described in my patent #2,324,612 relating to a "Warping or beaming machine," issued on July 20, 1943. An energization of the brake solenoid 318 causes an immediate application of the brakes of the warper simultaneously with the above described interruption of the supply of direct current to the electromotor 46 by the opening of the main switch M. The brake solenoid 318 is arranged in the following brake circuit: A line 420 branched off at the point 422 from a first line of the A. C. supply line leads to a time delay switch 424 of the time relay 412 and thence to one end of the brake solenoid 318. The other end of the brake solenoid 318 is connected with the junction point 426 in a second line of the A. C. supply line through a line 428 including the brake control switch 430 of a brake control relay or solenoid brake relay 432. An adjustable choke coil 433 is arranged in parallel to the time delay switch 424 of the time relay 412 by means of a line 421 branching off from the line 420. The electromagnet 434 controlling the brake control switch 430 of the brake control relay 432 is arranged in the following brake control circuit: A line 436 leading from the electromagnet 434 to the junction point 438, the portion of the line 388 from said junction point 438 to the trip coil magnet 374, the portion of the line 386 leading from the trip coil magnet 374 to the junction point 440, and the line 442 connecting said junction point 440 with the electromagnet 434. Thus, as soon as the motor start holding circuit including the trip coil magnet 374 is interrupted at the stop push button switch 414 or the switch 406 or the switch 402, the described brake control circuit including the electromagnet 434 of the brake control relay 432 is also interrupted, so that the electromagnet 434 is deenergized and the brake control switch 430 is closed. At the same time the electromagnet 410 of the time relay 412, which is arranged in the motor start holding circuit including the trip coil magnet 374 is also deenergized. Owing to the delaying action of the time relay 412, however, the time delay switch 424 remains for a short period, for example 2 sec., in the closed position 424' shown in dash lines, so that the brake circuit including the brake solenoid 318 will be closed and the latter will cause a strong application of the brakes 294, 296 and 322, 326 of the warper 20, as soon as the electromagnet 434 of the solenoid brake relay 432 is deenergized and the brake control switch 430 thereof is closed. After said short period of 2 sec., for example, however, the switch 424 of the deenergized time relay 412 comes into the open position shown in full lines, so that now the adjustable choke coil 433 is included in the brake circuit including the brake solenoid 318, whereby the energization of the brake solenoid 318 is automatically reduced to a predetermined degree for causing only a slight application of the brakes of the warper. Thus, after a short period of a strong application of the brakes for causing an immediate stoppage of the beam, a slight application of the brakes prevails as long as the supply of direct current to the electromotor 46 is interrupted and the latter is arrested. As soon as the electromotor 46 is restarted in a manner to be described hereinafter, the electromagnet 434 arranged in parallel to the trip coil magnet 374 is excited, so that the brake control switch 430 is opened and the brake solenoid 318 is deenergized for an immediate release of the brakes of the warper. Incidentally, it may be mentioned that the restarting of the electromotor 46 causes an energization of the electromagnet 410 of the time relay 412, which is arranged in the motor start holding circuit, so that the time delay switch 424 is again closed so as to render the brake circuit ready for the next braking operation in the manner described above. The above described slight application of the brakes of the warper during the standstill of the motor 46 may be adjusted by the choke coil 433 to such a degree that it permits an unwinding of a portion of the winding on the beam by the storage device 22 but prevents an undesired continuation of the rotation of the beam as soon as the storage device has been stopped for the termination of the unwinding operation.

If desired, however, the line 421 and the adjustable choke coil 433 may be omitted. Under these circumstances the brake solenoid 318 would be deenergized as soon as the time delay switch 424 of the time relay 412 comes into the open position, i. e., the brakes of the warper would be released already after a short period of application corresponding to the delaying action of the time relay.

The automatic electrical controlling means or motor field rheostat 258 arranged in the motor start holding circuit and controlled by the pressure roll 132 in dependence on the increase of the diameter of the winding 134 on the beam 44 serves to cause an automatic reduction of the operating speed of the electromotor 46 from a predetermined normal degree to a lower degree, so that a substantially constant travelling speed of the warp yarns resulting in a substantially constant tension in the yarns is obtained during the operation of the warper. The normal travelling speed of the warp yarns is determined by said predetermined normal operating speed of the electromotor 46 at the start of the warping operation. Different yarns of different size and/or material require different travelling speeds to obtain the proper tension in the yarns. For this purpose, an additional electrical adjusting means or a hand rheostat 350 is arranged on the frame of the warper 20 for the adjustment of said predetermined normal operating speed of the electromotor 46 driving the beam 44 by hand. This hand rheostat 350 is arranged in the following normal speed control circuit: A line 444 leads from the end 445 of the coil 446 of the generator field hand rheostat 350 to the pole $M_3$ of the main switch M, which in turn is connected with the junction point 448 in the line 388 by a line 450. A line 452 leads from said junction point 448 to the terminal 454 of the exciter 456 of the A. C. to D. C. motor generator set 26. The terminal 458 of the exciter 456 is connected with one end of the field 460 of the D. C. generator 356 by a line 462. The other end of the field 460 is connected with the movable finger 464 of the hand rheostat 350 through a line 466 including the switch 468 of the warp brake relay 408. The end 447 of the coil 446 of the hand rheostat 350 is connected with the junction point 470 in the line 462 through a line 472 leading to the junction point 474, through the portion of the line 398 connecting the junction point 474 with a junction point 476, and through a line 478 connecting the junction point 476 with the junction point 470. As will be apparent from the described connections, the generator field 460 is energized by the source of direct current or the exciter 456, which generates a constant potential. This potential is applied to a circuit comprising a first portion or the left hand portion (as viewed in Fig. 2) of the coil 446 of the generator field hand rheostat 350 in parallel with the generator field 460 and a second portion or the right hand portion of the coil 446 of the generator field hand rheostat 350 in series with these. A movement of the finger 464 across the generator field hand rheostat 350 will cause a variation of the potential applied to the generator field 460 and, consequently, a variation of the current flowing through this generator field during the normal operation of the warper. If, for example, the finger 464 is moved to the right, the energization of the generator field and the current flowing through said generator field are increased. Therefore, the current flowing through the generator field is in proportion to the setting of the finger 464 of the hand rheostat 350. This current, when high, gives a high voltage generated by the generator 356, when low, a low voltage generated, i. e., the potential generated by the generator is variable. The normal operating speed of the electromotor 46 at the start of the warping operation is determined by the voltage of the direct current supplied to the electromotor, and, therefore, the normal operating speed of the electromotor may be easily adjusted by means of the hand rheostat. It has been found that a wide speed range of the D. C. electromotor 46 may be obtained by connecting the hand rheostat 350 with an appropriate source of direct current in such a way, that the rheostat 350 controls the voltage of the direct current supplied to the electromotor 46 of the warper.

As will be apparent from the foregoing, a variation in speed of the electromotor 46 may be obtained on one hand by a change of the voltage output of the generator by means of the generator field hand rheostat 350 and on the other hand by a change of the excitation of the motor shunt field 394 by means of the automatic motor field rheostat 258. In other words, the generator field hand rheostat 350 serves to adjust a predetermined normal operating speed of the electromotor 46 of the warper by hand, while the automatic motor field rheostat 258 controlled by the pressure roll 132 of the warp serves to automatically reduce the operating speed of the electromotor 46 from said predetermined normal value to a lower value, so as to obtain a substantially constant tension in the yarns and/or constant travelling speed of the yarns respectively during the warping operation. For a better explanation of my invention, the operation of the electromotor 46 at said normal operating speed and at said reduced lower operating speed shall be termed the "normal high speed operation" of the electromotor in contrast to a very low speed operation or a so-called "inching speed operation" of the electromotor 46, which is desirable under certain circumstances only, as will be described hereinafter.

As described above, the switch 402 of the counter stop relay 404 and the switch 406 of the warp brake relay 408 are engaged in series in the motor start holding circuit. Therefore, these two switches 402 and 406 must be in closed position, or, in other words, the electromagnet 602 of the counter stop relay 404 and the electromagnet 482 of the warp brake relay 408 must be deenergized, if a continuous operation of the electromotor 46 at above mentioned high seped by an actuation and subsequent release of the start push button 382 is desired.

At first the circuits controlling the counter stop relay 404 with the switch 402 will be described hereinafter. The electromagnet 602 of said counter stop relay 404 is arranged in the following counter stop relay control circuit: A line 604 connects the electromagnet 602 with the left hand terminal of a switch 580 controlled by an electromagnet 606 of a shut off counter relay 582; a line 608 leads from the right hand terminal of said switch 580 to the junction point 610 in a line 550, a portion of which leads to one end of the secondary winding 546 of a low voltage transformer 548; a line 544 leads from the other end of said secondary winding 546 to a junction point 542, which is connected with the electromagnet 602 by a line 612. The primary winding 574 of the low voltage transformer 548 is connected with two lines of the A. C. supply line in the following manner: a portion of the line 428 between the junction point 426 and a junction point 510, and the line 576 connecting the junction point 510 with one end of the primary winding 574; the portion of a line 516 between a junction point 514 and a junction point 517, and a line 578 connecting the junction point 517 with the other end of the primary winding 574. It will be understood that the electromagnet 602 of the counter stop relay 404 will be excited and the switch 402 will be opened for an interruption of the motor start holding circuit as soon as the electromagnet 606 of the shut off counter relay 582 is deenergized causing a closing of the switch 580 arranged in the above described counter stop relay control circuit. Furthermore, it will be understood, that the electromagnet 602 of the counter stop relay 404 remains in deenergized condition and the switch 402 remains in closed position for closing the motor start holding circuit for a continuous operation of the electromotor 46 as long as the electromagnet 606 of the shut off counter relay 582 is excited for holding the switch 580 arranged in the above described counter stop relay control circuit in open position.

The electromagnet 606 of the shut off counter relay 582 is arranged in the following reset circuit: A line 614 connects the electromagnet 606 with the right hand terminal of a reset push button 616 arranged in the "Stop-start-station" 600 and normally held in open position by a spring (not shown); a line 618 leads from the left hand terminal of the reset push button switch 616 to a junction point 552, which is connected with one end of the secondary winding 546 of the low voltage transformer 548 by the line 550; a line 544 leads from the other end of the secondary winding 546 to a junction point 542 connected with the left hand terminal of the switch 418 of the shut off counter 98 by a line 540; the right hand terminal of said switch 418 is connected with the electromagnet 606 by a line 620. The shut off counter 98, which may be of any well known type, is driven by the beam 44 as described in my Patent #2,324,612, issued on July 20 1934. Prior to the start of a warping operation the shut off counter is set for a predetermined number of revolutions to be performed by the beam during the warping operation. When the shut off counter is set for said predetermined number of revolutions, the switch 418 of the counter is closed. Now, when the electromagnet 606 is excited by an actuation of the spring loaded reset push button 616, the switch 580 is opened and the switch 402 is closed, the latter being controlled by the electromagnet 602, which is deenergized by the opening of the switch 580. Now, the motor start holding circuit is closed at the switch 402 for a continuous operation of the electromotor 46.

When the electromagnet 606 of the shut off counter relay 582 is excited by closing above described reset circuit by means of the spring loaded reset push button switch 616, a switch 581 also controlled by the electromagnet 606 is closed, whereby a reset holding circuit including the electromagnet 606 is closed as will be described hereinafter, so that the electromagnet 606 remains in excited condition and the switch 402 of the motor start holding circuit remains in closed position upon a subsequent release of the spring loaded reset push button switch 616 as long as the switch 418 of the shut off counter 98 remains in closed position. The reset holding circuit may be traced as follows starting from the upper terminal of the electromagnet 606: The line 620, the switch 418 of the shut off counter 98, the line 540 up to the junction point 434, the line 544, the sevondary winding 546, the line 550 up to the junction point 610, the line 608 connecting said junction point 610 with the right hand terminal of the switch 581, and a line 622 connecting the left hand terminal of said switch 581 with the electromagnet 606.

Owing to the fact that above described reset holding circuit includes the switch 418 of the shut off counter, the electromagnet 606 will be deenergized and consequently, the switch 580 will be closed and the switch 402 will be opened for an immediate stoppage of the electromotor 46 and application of the brakes 294, 296 and 322, 326 of the warper in the manner described above, as soon as the switch 418 of the shut off counter 98 is automatically opened after the beam has performed the predetermined number of revolutions for which the shut off counter has been previously set.

As will be apparent from the foregoing, after a stoppage of the warper by the shut off counter 98, a new continuous operation of the electromotor 46 cannot be obtained by pressing and releasing the start push button 382 unless the operator has first reset the shut off counter to a predetermined number of revolutions to be performed by the beam and has also reset the shut off counter relay 582 by an actuation of the reset push button 616.

In order to indicate the stoppage of the warper by the shut off counter 98 at the end of a warping operation, a pilot lamp 624 installed in the "Stop-start-station" 600 is arranged in the following signal circuit: A line 626 leading from the left hand terminal of the pilot lamp 624 to a junction point 628 in the line 604, the portion of the line 604 leading from the junction point 628 to the switch 580, the switch 580, the line 608 up to the junction point 610, the portion of the line 550 leading from the junction point 610 to the secondary winding 546, the line 544 up to the junction point 542, the line 540 up to a junction point 538, a line 536 connecting said junction point 538 with a junction point 534, a line 532 connecting said junction point 534 with a junction point 530, and a line 630 connecting said junction point 530 with the right hand terminal of the pilot lamp 624. Thus, as soon as the warper is stopped by the shut off counter 98, whereby the switch 580 controlled by the electromagnet 606 of the shut off counter relay 582 and arranged in above described signal circuit is closed, the pilot lamp 624 lights up thus indicating to the operator that the desired length of yarn has been warped and that the shut off counter 98 and its relay 582 have to be reset for a new warping operation. When the shut off counter and its relay are reset by setting the counter and pushing down the spring loaded reset push button 616, the electromagnet 606 of the shut off counter relay 582 is again excited, whereby the switch 580 is opened and the pilot lamp is switched off thus indicating to the operator that the motor start holding circuit is closed at the switch 402 and the electromotor 46 may be restarted for a new warping operation.

Now, the circuits controlling the warp brake relay 408 containing the switch 406 also arranged in the motor start holding circuit will be described. The electromagnet 482 of the warp brake relay 408 controlling the switch 406 is arranged in the following warp brake relay control circuit: A line 568 connects the electromagnet 482 with the left hand terminal of a switch 566 controlled by an electromagnet 556 of a warp brake sensitive intermediate relay 558; a line 572 leads from the right hand terminal of said switch 566 to a junction point 570 in the line 550; the portion of the line 550 that leads from said junction point 570 to one end of the secondary winding 546 of the low voltage transformer 548; the secondary winding 546; the line 544 leading from the secondary winding 546 to the junction point 542, and the portion of the line 540 that leads from said junction point 542 to the electromagnet 482. Obviously, the electromagnet 482 of the warp brake relay 408 will be excited for opening the switch 406 so as to cause a stoppage of the electromotor 46 and an application of the brakes of the warper in the manner described above, as soon as the electromagnet 556 of the warp brake sensitive intermediate relay 558 is excited for closing the switch 566.

The electromagnet 556 is arranged in the following needle control circuit: A line 630 connecting the electromagnet 556 with one terminal of a creel terminal base 632 mounted on the creel 24; the control needle 416; a line 634 leading from the other terminal of the creel terminal base 632 to the junction point 534; the line 536 connecting the junction point 534 with the junction point 538; the portion of the line 540 that connects the junction point 538 with the junction point 542; the line 544; the secondary winding 546 of the low voltage transformer 548; the line 550 up to the junction point 552; and a line 554 connecting the junction point 552 with the electromagnet 556. Although Fig. 2 diagrammatically illustrates only one control needle 416 arranged on the creel terminal base 632, the creel carries a plurality of control needles 416, one for each warp yarn 34 to be drawn from a bobbin 36. The several control needles 416 of the creel are arranged in several rows and are electrically connected in parallel to each other with the creel terminal base 632. Therefore, if one or more control needles 416 of the creel drop owing to a breakage of yarn, the above described needle control circuit is closed, whereby the electromagnet 556 of the warp brake sensitive intermediate relay 558 is excited, so that the switch 566 is closed which in turn causes an energization of the electromagnet 482 of the warp brake relay 408 resulting in an opening of the switch 406 causing an interruption of the motor start holding circuit for a stoppage of the electromotor 46 and an application of the brakes in the manner described above.

A control lamp 636 is arranged in series with each row of control needles 416, so that upon the dropping of a control needle caused by the breakage of a yarn the control lamp associated with the row of control needles containing the control needle closing the needle control circuit lights up. For the sake of simplicity, Fig. 2 shows only one control lamp 636 arranged in the line 630 of the needle control circuit as it shows only one control needle 416.

In the foregoing paragraphs the energization of the electromagnet 556 of the warp brake sensitive intermediate relay 558 by means of a control needle 416 has been described. An energization of the electromagnet 556 resulting in an opening of the switches 406 and 468 both controlled by the electromagnet 482 of the warp brake relay 408 may also be obtained by an inching speed switch 490. As more fully described in my Patent #2,302,700, issued November 24, 1942, the inching speed switch 490 is arranged on the movable carriage 64 carrying the movable gripping means 40. As long as the carriage 64 is in its upper inactive position shown in full lines in Fig. 1, the inching speed switch 490 is open. The inching speed switch 490 is connected in parallel to the control needles 416 with the needle control circuit by the following lines: a line 564 leading from the right hand terminal of the inching speed switch 490 to one end of an adjustable resistor 562, the other end of which is connected with the electromagnet 556 by a line 560; a line 528 leading from the left hand terminal of the inching speed switch 490 to the junction point 530 connected with the junction point 534 by the line 532. Thus, the electromagnets 556 and 482 may also be excited by closing the inching speed switch 490 upon the downward movement of the carriage 64 of the storage device. It may be mentioned, that the adjustable resistor 562 may be adjusted to a resistance substantially equal to the resistance of one control lamp 636 arranged in series with one row of control needles 416.

An energization of the electromagnet 482 of the warp brake relay 408 by a control needle 416 or by the inching speed switch 490 as described above causes a simultaneous opening of the switches 406 and 468. The switch 406 is arranged in the motor start holding circuit, and an opening of the switch 406 causes a stoppage of the warper and an application of the brakes, as described above. The speed control switch 468 is arranged in the normal speed control circuit including the generator field 460 and the generator field hand rheostat 350 as described above. If the speed control switch 468 is opened by an energization of the electromagnet 482, the generator field hand rheostat 350 is disconnected from the generator field 460. An adjustable inching resistor 484 is arranged in series with the generator field 460 between the junction points 486 and 488 in the lines 466 and 444 respectively, so that, after the above mentioned disconnection of the generator field hand rheostat 350 from the generator field 460, the current now may flow through the following inching speed control circuit: exciter 456, line 462, generator field 460, line 466, inching resistor 484, line 444, pole M₃, lines 450, 452. Therefore, under these circumstances and upon a closing of the main switch M including the pole M₃, a current proportional to the combined resistance of the generator field 460 and the adjustable inching resistor 484 arranged in series with each other will pass through the generator field, setting up a flux which will produce a low voltage required for the low inching speed and the low torque of the electromotor 46. It may be mentioned that this flux, and therefore voltage and torque, are independent of the setting of the generator field hand rheostat 350, as the latter is disconnected from the generator field 460. On the other hand, the generator field hand rheostat 350 will be reconnected with the generator field 460 and a further operation of the electromotor 46 at inching speed will be rendered impossible as soon as the speed control switch 468 controlled by the electromagnet 482 of the warp brake relay 408 is returned into closing position upon an interruption of the needle control circuit by the control needle 416 and/or by the inching speed switch 490.

As pointed out above, the switches 406 and 468 are simultaneously opened or closed by the electromagnet 482 of the warp brake relay 408. Therefore, if the speed control switch 468 is opened for an operation of the electromotor 46 at inching speed by establishing the inching speed control circuit, the switch 406 arranged in the motor start holding circuit is also opened. Therefore, the electromotor 46 can be operated at inching speed only for such a time as the motor start circuit including the trip coil magnet 344 controlling the main switch M is closed by depressing the start push button 382 against the action of its spring or by closing an auxiliary start switch 492 arranged on the storage device 22. Said auxiliary start switch 492 is connected in parallel to the start push button 382 with the motor start circuit by means of the following auxiliary start circuit: a line 590 leads from the junction point 588 in the line 398 of the motor start circuit to the right hand terminal of the auxiliary start switch 492; a line 583 connects the left hand terminal of the auxiliary start switch 492 with the right hand terminal of a control switch 494 arranged on the storage device 22; and a line 584 connects the left hand terminal of the control switch 494 with the junction point 586 in the line 384 of the motor start circuit. As the auxiliary start switch 492 and the control switch 494 are arranged in series, the operation of the electromotor 46 at inching speed by means of the auxiliary start switch 492 requires the closing of the control switch 494, and the operation of the electromotor 46 at inching speed is terminated as soon as the control switch 494 is opened.

As more fully described in my Patent #2,302,700, issued November 24, 1942, the control element 495 of the control switch 494 is mounted on a clamping board 110 loosely resting on the carriage 64 (see Fig. 1). When the carriage is in its inactive position shown in full lines, the control switch 494 is open. During the downward movement of the carriage 64 the control switch 494 is closed by its control element 495, as soon as the clamping board 110 is deposited on a stationary clamping board 102 and clamps the warp 34. The control switch 494 remains in closed position during the further downward movement of the carriage 64 into its active position shown in dash and dot lines in Fig. 1. During the downward movement of the carriage 64 from said active position, the control switch 494 is opened, as soon as the clamping board 110 is moved away from the stationary clamping board 102 and the warp 34 by the carriage 64. This opening of the control switch 494 takes place prior to the opening of the auxiliary start switch 492 as will be described hereinafter.

Furthermore, as more fully described in my Patent #2,302,700, issued November 24, 1942, the control element 493 (Fig. 1) of the auxiliary start switch 492 is rigidly connected with the handle 497 of the reversing switch 496 and is constructed in such a way that it closes the auxiliary start switch 492 only when the handle 497 of the reversing switch is turned into the position 497b for upward movement of the carriage 64. When the handle 497 is in the neutral position shown in full lines in Fig. 1 or in the position 497a for downward movement of the carriage 64, the control element 493 of the auxiliary start switch 492 is out of contact with the latter, so that the auxiliary start switch is open. Thus, during the downward movement of the carriage 64 the auxiliary start switch 492 remains open, and as soon as the handle 497 of the reversing switch is turned into the position 497b for an upward movement of the carriage 64, the auxiliary start switch 492 is closed. It may be mentioned that the control element 493 of the auxiliary start switch 492 is of such a length, that it closes the auxiliary start switch shortly before the closing of the reversing switch 496 for an upward movement of the carriage 64, so that the warp yarns are already under a certain tension when the lifting of the carriage 64 is started. The auxiliary start switch 492 remains in closed position during the upward movement of the carriage 64, until, at the end of the upward movement, the handle 497 of the reversing switch 496 is automatically returned into the neutral position as described in my Patent #2,302,700, issued November 24, 1942. This return of the handle 497 causes an opening of the auxiliary start switch 492, after the control switch 494 has been opened previously by the lifting of the clamping board 110 carrying the control element 495 during the upward movement of the carriage 64. It may be mentioned, that, during the upward movement of the carriage into its uppermost inactive position, the inching speed switch 490 is opened after the opening of the control switch 494 and shortly before the opening of the auxiliary start switch 492.

As pointed out above, the reversing switch 496 serves to control the reversible motor 480 actuating the carriage 64 with the movable gripping means 40. For this purpose, the following reversible motor circuits are provided: Upon closure of the hand switch 354 the three lines of the A. C. supply line are connected with the three terminals 500, 502, 504 of the reversing switch 496 in the following manner: the first line from the junction point 422, through the line 420 to the junction point 506, and thence through the line 508 to the terminal 502; the second line, from the junction point 426 through the line 428 to the junction point 510, and thence through the line 512 to the terminal 504; the third line, from the junction point 514 through the line 516 to the terminal 500. The terminals 515, 518 and 520 of the reversing switch 496 are connected with the reversible motor 480 through the lines 522, 524 and 526 respectively. Thus, when the handle 497 of the reversing switch 496 is in the neutral position shown in full lines in Fig. 1 and the terminals 502 and 518 are connected with each other, the reversible motor 480 and the carriage 64 connected with said motor are at a standstill; when the handle 497 is in the position 497a and the terminal 504 is connected with the terminal 515 and the terminal 500 is connected with the terminal 520, the reversible motor 480 is operated in one direction of rotation for causing a downward movement of the carriage, and when the handle 497 is in the position 497b and the terminal 504 is connected with the terminal 520 and the terminal 500 is connected with the terminal 515, the reversible motor 480 is operated in the other direction of rotation for causing an upward movement of the carriage.

As pointed out above, under certain circumstances, a very low speed or a so-called inching speed of the electromotor 46 driving the beam 44 is desirable. For example, first, at the beginning of a warping operation, until a few layers of the winding have been wound on the beam; second, after the occurrence of a yarn breakage in the creel and the tying of the ends of the broken yarns without the use of the storage device; third, after the occurrence of a yarn breakage at a point between the creel and the beam and the tying of the broken ends of the yarns subsequent to the temporary unwinding of a portion of the warp from the beam by means of the storage device. In the first instance, the warp should be taken up by the beam in the warper at a very low speed, until after the winding of a few layers, the warping operation proper may be safely started at the normal high speed; in the second instance, the warp should be drawn from the creel at a very low speed, until the slack in the yarn or yarns has been taken up; in the third instance, the warp folded in the storage device as shown in dash and dot lines in Fig. 1 should be taken up by the beam in the warper at a very low speed during the return of the carriage 64 carrying the gripping means 40 by the reversible motor 480 from its lower active position into its upper inactive position, until the warp is released by the clamping board 110.

In the first instance, i. e., in the beginning of a warping operation, at first the carriage 64 of the storage device is lowered from its uppermost inactive position into an intermediate position, wherein the clamping board 110 has not yet been deposited on the warp and the control switch 494 controlled by the control element 495 carried by the clamping board is still open, wherein, however, the inching speed switch 490 controlled by the carriage 64 is already closed. The auxiliary start switch 492 mechanically coupled with the handle 497 of the reversing switch 496 is also open, as the handle 497 is in its neutral position. The closing of the inching speed switch 490 causes an energization of the electromagnets 556 and 482 resulting in an opening of the speed control switch 468, whereby the inching speed control circuit is established. Now, an operation of the electromotor 46 at inching speed may be obtained by depressing and holding the spring loaded normal start push button 382 in the depressed position as long as desired, i. e., until a few layers of the winding have been wound on the beam. Thereupon, the normal start push button 382 is released, so that the electromotor 46 is stopped, as the motor start circuit is interrupted at the start push button switch 382 and the motor start holding circuit is interrupted at the switch 406 still in open position owing to the energization of the electromagnet 482 caused by the closed inching speed switch 490. Now, the carriage 64 is returned into its uppermost inactive position by turning the handle 497 into the position 497b; this actuation of the handle 497, however, does not cause an operation of the electromotor 46 by the auxiliary start switch 492 coupled with the handle 497, as the control switch 494 arranged in series with the auxiliary start switch 492 is open. Upon return of the carriage 64 into its uppermost inactive position, the electromotor 46 of the warper may be started at normal high speed operation, by depressing the start push button 382 for a short period of time, as now the inching speed switch 490 is opened, so that the electromagnet 482 is deenergized and the switch 406 arranged in the motor start holding circuit and the speed control switch 468 arranged in the normal speed control circuit are closed.

In the second instance, i. e., after the occurrence of a yarn breakage in the creel and the tying of the broken ends of the yarn or yarns without the use of the storage device, the carriage 64 of the storage device is in its uppermost inactive position, so that all switches 490, 492 and 494 are in open position. Owing to the slack in the yarn or yarns, the broken ends of which have been tied with each other, one or more control needles 416 still make contact, so that the needle control circuit is still closed and, consequently, the electromagnet 482 is still excited. Therefore, the switch 406 arranged in the motor start holding circuit and the speed control switch 468 arranged in the normal speed control circuit are still open. Now, an operation of the electromotor 46 at inching speed may be obtained by depressing and holding the spring loaded normal start push button 382. As soon as the slack in the previously tied yarn or yarns has been taken up, the contact at the control needle or needles 416 is broken, whereby the needle control circuit is interrupted and the electromagnet 482 is deenergized, so that the switches 406 and 468 are closed. Thus, the motor start holding circuit is closed again and the generator field hand rheostat 350 is reconnected with the generator field 460, so that the speed of the electromotor 46 automatically rises to its set value and the electromotor continues its operation at the high operating speed; now, the start push button 382 may be released, as the motor start holding circuit is closed.

In the third instance, i. e., after the occurrence of a yarn breakage and the tying of the broken ends of the yarns subsequent to the temporary unwinding of a portion of the warp from the beam, the carriage 64 of the storage device is in its lower active position shown in dash and dot lines in Fig. 1, so that the inching speed switch 490 and the control switch 494 are closed. The auxiliary start switch 492 is open at that time, as the handle 497 is in its neutral position when the carriage 64 is at a standstill. The closing of the inching speed switch 490 causes an energization of the electromagnets 556 and 482 resulting in an opening of the switches 406 and 468. Simultaneously with the turning of the handle 497 of the reversing switch 496 into the position 497b for causing an upward movement of the carriage 64, the auxiliary start switch 492 mechanically coupled with the handle 497 is closed, so that owing to the closing of the control switch 494 and the inching speed switch 490 the electromotor 46 is started at inching speed. As soon as, during the upward movement of the carriage and after the slow taking up of the warp folded in the storage device, the carriage reaches a position, wherein the clamping board 110 is moved away from the warp 34 and the control switch 494 is opened, the electromotor 46 is stopped, although the auxiliary start switch 492 arranged in series with said control switch 494 is still closed. The upward movement of the carriage 64, however, continues, and, in the uppermost inactive position of the carriage, the auxiliary start switch 492 and the inching speed switch 490 are automatically opened. Now, the electromagnet 482 is deenergized and the switches 406 and 468 are closed, inasmuch as, after the slow taking up of the warp, no slack prevails in the yarns and the control needles 416 also controlling the electromagnet 482 are in open position. Now, the electromotor 46 may be started at normal high operating speed by depressing the normal start push button 382 and releasing same after a short period of time.

During the inching operation, the tension in the yarns is constant irrespective of the setting of the generator field hand rheostat 350 and irrespective of the amount of yarn already warped. This is accomplished, first, by the fact that the generator field hand rheostat 350 is disconnected from the generator field 460 during the inching operation, and, second, by the fact that the torque of the electromotor 46 is increased by the building up of the warp by means of the automatic motor field rheostat 258 controlled by the pressure roll 132.

As will be apparent from above description, the electromotor 46 must be started at full load and at various speeds. In order to take care of these varying conditions, the electromagnet 364 of the motor field vibrating relay 366 is arranged in the main motor circuit, and the terminals of the spring loaded vibrating switch 638 controlled by the electromagnet 364 are connected with the junction points 640 and 642 respectively in the motor start holding circuit by lines 644 and 646 respectively. Thus, the vibrating switch 638 will short circuit the automatic motor field rheostat 258, when the load current, which passes through the electromagnet 364 of the vibrating relay 366, reaches a definite limit. The spring connected with the vibrating switch 638 returns same into open position, as soon as the load current passing through the electromagnet 364 falls below said definite limit. The action of the vibrating relay 366 continues, until a stable condition of the load current below said definite limit has been established.

The operation of the electromotor 46 of the warper is automatically stopped, as soon as the stop push button 414 is depressed by hand, or as soon as one or more control needles 416 drop upon a yarn breakage in the creel or at a point between the creel and the beam, or as soon as the switch 418 of the shut off counter 98 is automatically opened at the end of a warping operation after the warping of the predetermined length of warp for which the shut off counter is set. In the first and second case, the electromagnet 606 of the shut off counter relay 582 is not affected, so that a restarting of the electromotor 46 at normal high speed or at inching speed by the start push button 382 or by the auxiliary start switch 492, as the case may be, may be carried out without a previous resetting of certain circuits of the control system by means of the reset push button 616. In the third case, however, the switch 418 of the shut off counter 98 is automatically opened, whereby the electromagnet 606 controlling the electromagnet 602 is deenergized and the switch 402 arranged in the motor start holding circuit is opened, so that the shut off counter must be reset and the reset push button 616 must be actuated before a new continuous operation of the electromotor 46 by an actuation and subsequent release of the spring loaded start push button 382 may be obtained. If the shut off counter were not reset and/or the reset pushbutton 414 were not actuated, the electromotor 46 could be operated at normal high speed or at inching speed only for such a time, as the start push button 382 is held in depressed position; a release of the start push button would cause a stoppage of the electromotor 46 under these conditions. The pilot lamp 624 connected with the counter stop relay control circuit lights up only in the third case, when the switch 418 of the shut off counter is opened. In all three cases the brakes of the warper controlled by the electromagnet 434 of the brake control relay 432 are immediately applied upon the arresting of the electromotor 46. If the choke coil 433 is omitted, the brakes are released after a short period of time by the action of the time relay 412, if the choke coil 433 is arranged in the control system, the action of the time relay 412 causes a reduction of the force of application of the brakes to a low degree determined by the choke coil after a short period of time, and the brakes are entirely released as soon as the electromotor 46 is restarted either at inching speed or at normal high speed, as the electromagnet 434 is arranged in parallel to the motor start circuit.

As will be apparent from above description of the control system, the electromagnet 482 of the warp brake relay 408 is excited upon the closing of the inching speed switch 490 and/or the closing of a control needle 416. Therefore the speed control switch 468 controlled by said electromagnet 482 remains in open position as long as one or more control needles 416 make contact, or in other words, the electromotor 46 can be operated at inching speed only as long as the warp yarns are not in proper position and cause contacts by the control needles 416. Furthermore, it may be mentioned that the switch 406 also controlled by the electromagnet 482 of the warp brake relay 408 and arranged in the motor start holding circuit in series with the electromagnet 410 of the time relay 412 remains in open position as long as the condition for inching speed operation prevails. Therefore, the motor start holding circuit is interrupted during the inching operation, and an inching speed operation of the electromotor 46 by means of the spring loaded start push button 382 can be obtained only for such a time as the start push button is held in depressed position. Furthermore, the electromagnet 410 of the time relay 412 remains deenergized and the switch 424 of said time relay remains in open position during the inching operation owing to the interruption of the motor start holding circuit. Therefore, after the termination of an inching operation the brakes of the warper are not applied if the choke coil 433 is omitted, or the brakes are only slightly applied depending on the adjustment of the choke coil if the choke coil is arranged in the control system.

Preferably, the warp brake relay 408, the warp brake sensitive intermediate relay 558, the shut off counter relay 582, the time delay relay 412, the low voltage transformer 548, the counter stop relay 404, the brake control relay 432 and the motor field vibrating relay 366 are arranged in an electrical control box 648 mounted on the frame of the warper 20.

In a preferred embodiment of my invention I use a standard alternating current of 220 volts for example in the A. C. supply line, in the reversible motor circuits and in the brake circuit; the generator 356 of the A. C. to D. C. motor generator set 26 produces a direct current of 230 volts supplied to the main motor circuit, motor start circuit, motor start holding circuit, brake control circuit, normal speed control circuit and inching speed control circuit; the primary winding 574 of the low voltage transformer 548 is fed with alternating current of 220 volts and the secondary winding 546 of said transformer delivers alternating current at 18 volts to the reset circuits, the reset holding circuit, the counter stop relay control circuit, the signal circuit, the warp brake relay control circuit, and the needle control circuit.

Fig. 4 illustrates a different embodiment of an electrical control system according to my invention adapted for use in a beaming plant including a beamer 700 and a creel 2400 shown in Fig. 3. The arrangement of the various circuits of the electrical control system according to Fig. 4 and its principle of operation are substantially the same as the arrangement of the circuits and the principle of operation of the above described system according to Fig. 2, so that it is sufficient to describe hereinafter only the differences between the two systems.

For a full description of the construction and operation of the beamer 700 reference is had to my copending patent application relating to a "Beamer," Serial #419,833, filed on November 21, 1941. Hereinafter, only those parts of the beamer are described, which are necessary for the understanding of the application of my electrical control system to the beaming plant.

An electromotor 4600 mounted on the frame of the beamer 700 in a suitable manner drives the main shaft 702 by means of a belt 704 trained around a pulley 706 secured to the shaft 708 of the electromotor 4600 and around a pulley 710 secured to the main shaft 702. A pinion 712 secured to the main shaft 702 serves to drive the beam 4400 through the medium of a gear 714 secured to the beam.

A cradle 716 for receiving and lifting the beam 4400 into operating position is swingably mounted on the main shaft 702 and carries a gear segment 718 meshing with a pinion 720 secured to a cross shaft 722 carrying a worm gear 724. A worm 726 secured to the lower end of a spindle 728 carrying a hand wheel 730 at its upper end meshes with the worm gear 724. On each side of the cradle 716 a roller 732 is rotatably arranged on the free end of the cradle for bearing engagement with a brake drum 734 mounted on the beam 4400. The brake drums 734 arranged on each side of the beam are adapted for cooperation with brake bands (not shown). In order to insert a beam into the beamer, the cradle is moved into its lower receiving position with the roller in the position 732' by turning the hand wheel 730. After a beam has been placed into the cradle with its drums 734 in bearing contact with the rollers 732, the hand wheel is turned in opposite direction for lifting the cradle with the beam until they reach the operating position shown in full lines in Fig. 3. A lug 736 arranged on the cradle contacts the control element 651 of a safety switch 650 mounted on the frame of the beamer, as soon as the cradle and the beam are in their operating position. Said safety switch 650 is normally held in open position by a spring (not shown) and is closed upon contact of the lug 736 with the control element 651. As best shown in Fig. 4, the safety switch 650 is arranged in the line 386 of the motor start circuit and motor start holding circuit, so that the beamer can be started only when the beam 4400 is in operating position whereby the safety switch is closed. As soon as the cradle 716 and beam 4400 are moved away from the operating position, the lug 736 is disengaged from the control element 651 of the safety switch 650, so that the latter is opened by its spring and the motor start circuit is interrupted whereby a starting of the electromotor 4600 is rendered impossible.

A pressure roll 1320 rotatably mounted on an assembly 738 swingably arranged on the frame of the beamer at 740 is held in contact with the winding on the beam 4400 by the action of its own weight. The assembly 738 carries a gear segment 744 meshing with a pinion 746 secured to a cross shaft 748 carrying a sprocket 750. The sprocket 750 is connected with a sprocket 752 secured to a cross shaft 754 by means of a chain 756. The cross shaft 754 carries the movable finger (not shown) of the automatic motor field rheostat 2580, which is electrically connected with the circuits of the control system in the same way as the automatic motor field rheostat 258 of the warping plant according to Figs. 1 and 2. The assembly 738 is moved in clockwise direction as viewed in Fig. 3 in accordance with the increase of the diameter of the winding on the beam 4400 during the beaming operation, so that the automatic motor field rheostat 2580 is adjusted in dependence on the building up of the winding on the beam through the medium of the gear segment 744, pinion 746 and chain drive 750, 752, 756.

The generator field hand rheostat 3500 electrically connected with the control system in the same way as the generator field hand rheostat 350 of the warping plant according to Figs. 1 and 2 is mounted on the frame of the beamer in any suitable manner.

The A. C. to D. C. motor generator set 2600 and the hand switch 3540 for connecting the A. C. supply line 30 with the circuits of the control system are also mounted on the beamer.

Furthermore, the beamer carries the control box 6480 containing the relays 408, 558, 582, 412, 404, 432, 366 and the transformer 548.

Unlike the warping plant shown in Fig. 1, the beaming plant shown in Fig. 3 has no storage device arranged between the beamer and the creel. Therefore, the inching speed switch 490, the auxiliary start switch 492 and the control switch 494 and their connections with the circuits of the control system shown in Fig. 2 are omitted in the control system shown in Fig. 4. In order to obtain an inching speed operation of the electromotor 4600, an inching speed switch 4900 is mounted on the beamer 700. According to Fig. 4, the inching speed switch 4900 is connected with the warp brake relay control circuit in parallel to the switch 566 of the warp brake sensitive intermediate relay 558 by lines 652. The inching speed switch 4900 is normally held in open position by means of a spring (not shown). If the inching speed switch is closed by hand, the electromagnet 432 of the warp brake relay 408 is excited whereby the speed control switch 468 is opened for a disconnection of the generator field hand rheostat 3500 from the generator field 460 and the electromotor 4600 may be operated at inching speed upon closure of the start switch 3820. As best shown in Fig. 4, the start switch 3820 and the stop switch 4140 are electrically connected with the circuits of the control system in the same way as the start push button switch 382 and the stop push button switch 414 of the warping plant shown in Fig. 2. Unlike the start push button switch and the stop push button switch of the warping plant, however, the start switch 3820 and the stop switch 4140 of the beaming plant are not arranged on a "Stop-start-station" together with the reset push button 6160 and the pilot lamp 6240. The reset push button 6160 and the pilot lamp 6240 electrically connected with the control system in the same manner as the reset push button 616 and the pilot lamp 624 of above described warping plant are arranged on a separate "Reset station" 654 mounted on the frame of the beamer 700. The stop switch 4140, the inching speed switch 4900 and the start switch 3820 are arranged on a separate "Stop-inch-start-station" 656. As more fully described in my copending patent application Serial #419,833, filed on November 21, 1941, a shipper rod 758 subjected to the action of a spring 760 and rotatably mounted at 762 serves to control all three switches 4140, 4900, 3820 through a suitable mechanism generally indicated by 764 in the following manner: Fig. 3 illustrates the shipper rod 758 and the mechanism connected therewith in neutral position. If the spring loaded shipper rod 758 is turned by hand through a certain angle in clockwise direction as viewed in Fig. 3, the inching speed switch 4900 and the start switch 3820 are closed without an actuation of the stop switch 4140, so that the electromotor 4600 operates at inching speed as long as the shipper rod 758 is held against the action of its spring 760 in said position causing a closure of the inching speed switch and the start switch. If the shipper rod 758 is turned further in clockwise direction, a spring actuated swingable element 766 forming a part of the mechanism 764 is disengaged from the spring loaded control element 4910 of the inching speed switch 4900 and causes an automatic release and opening of the inching speed switch 4900, while the start switch 3820 remains in closed position, so that the electromotor 4600 runs at normal high speed operation. Now, if the shipper rod 758 is released and is returned into its neutral position by means of its spring 760, the start switch 3820 is opened and the swingable element 766 swings past the spring loaded control element 4910 without actuating same, i. e., without causing a closing of the inching speed switch; thus, the electromotor 4600 continues its operation at normal high speed operation due to the action of above described motor start holding circuit. In order to stop the electromotor 4600 by hand, the shipper rod 758 is turned from its neutral position in counter-clockwise direction, whereby the stop switch 4140 is closed without an actuation of the inching speed switch 4900 and the start switch 3820. Upon release of the shipper rod, the latter is returned into neutral position by its spring 760.

As will be understood from the diagram shown in Fig. 4 and from above description of the circuits of the control system, the speed control switch 468 is also controlled by the control needles 4160 in the creel through the medium of the warp brake sensitive intermediate relay 558 and its switch 566. Therefore, if the operator turns the shipper rod 758 into its end position, wherein the inching speed switch 4900 is open and the start switch 3820 alone is closed, the electromotor 4600 can operate at inching speed only as long as one or more control needles 4160 make contact owing to slack in warp yarns 3400 for example. As soon as the slack in the warp yarns is taken up by the beam and the contact at the control needles 4160 is broken, the electromotor 4600 rotates at normal high speed.

As best shown in Fig. 3, the warp 3400 is trained around a measuring roll 768 rotatably mounted on the frame of the beamer at 770. Said measuring roll drives the shut off counter 9800 through the medium of suitable gears (not shown). The shut off counter 9800 of the beamer is electrically connected with the circuits of the control system in the same manner as the shut off counter 98 of above described warper and operates according to the same principle. Likewise, the reset push button 6160 of the beamer operates in the same manner as the reset push button 616 of the warper.

While the brakes of the warper shown in Fig. 1 are actuated by means of a brake solenoid 318, the brakes of the beamer shown in Fig. 3 are actuated by means of a so-called torque motor 772, i. e., a motor with high starting torque, which may be loaded to such a degree that a stoppage occurs without an undue heating of the parts of the motor. The torque motor 772 is secured to the frame of the beamer in suitable manner and carries on its shaft 774 a pinion 776 meshing with a gear segment 778 secured to a shaft 780 rotatably arranged in the beamer. An arm 782 secured to the shaft 780 is connected with a link 784 actuating the brake band (not shown) of the brake for the beam 4400 through the medium of an arm 786 pivoted to a stationary part of the beamer at 788. An arm 790 integral with the body of the gear segment 778 is connected with a Bowden wire 792 actuating the brake (not shown) of the pressure roll 1320. An arm 794 also integral with the body of the gear segment 778 is connected with a link 796 actuating the brake (not shown) of the measuring roll 768. Thus, if the torque motor is switched on, the brakes of the beam 4400, of the pressure roll 1320 and of the measuring roll 768 are applied simultaneously by means of the gear segment 778 and the arms 782, 790 and 794 connected therewith.

The masses of the pressure roll and measuring roll remain constant during the beaming operation, while the mass of the beam is increased owing to the building up of the winding on the beam. As more fully described in my copending patent application Serial #419,833, filed November 21, 1941, the action of the brakes on the pressure roll and measuring roll is effected by braking springs released by the torque motor, while the action of the brake on the beam is effected by a brakinig band controlled by the output of the torque motor. The braking springs exert a constant force on the constant masses of the pressure roll and measuring roll, so that the braking time of the pressure roll and measuring roll remain constant. In order to obtain the same constant braking time for the mass of the beam varying with the building up of the winding on the beam, I provide an automatically adjustable resistor 658 for varying the output of the torque motor in dependence on the building up of the winding on the beam. The movable finger (not shown) of the resistor 658 is connected with the cross shaft 754 controlled by the pressure roll 1320 through the medium of the gear segment 744, the pinion 746 and the chain drive 750, 752, 756 in dependence on the increase of the diameter of the winding on the beam.

As best shown in Fig. 4, the torque motor 772 is connected with the electrical control system by means of the following torque motor brake circuit: A line 660 leading from the junction point 506 to the terminal 662, said line including the pole $S_1$ of a triple pole torque motor switch S and a first coil of the adjustable resistor 658; a line 664 leading from the junction point 510 to the terminal 666, said line including the pole $S_2$ of the triple pole torque motor switch S and a second coil of the resistor 658; a line 668 leading from the junction point 517 to the terminal 670, said line including the pole $S_3$ of the triple pole torque motor switch S and a third coil of the resistor 658.

The triple pole torque motor switch S is controlled by the electromagnet 672 of a torque motor relay 674. The electromagnet 672 is arranged in the following controlling brake circuit starting from the upper terminal of the secondary winding 546 of the low voltage transformer 548: A line 676 leading from the upper terminal of the secondary winding to the left hand terminal of the brake control switch 430 of the brake control relay 432; a line 678 connecting the right hand terminal of the switch 430 with the electromagnet 672; a line 680 connecting the electromagnet 672 with the right hand terminal of the switch 424 of the time relay 412; and a line 682 connecting the left hand terminal of the switch 424 with the lower terminal of the secondary winding 546. Thus, as soon as the brake control switch 430 is closed upon an interruption of the motor start holding circuit as described above, the electromagnet 672 is excited causing a closing of the triple pole torque motor switch S resulting in a switching on of the torque motor 772 and an application of the brakes of the beamer. After a short period of time, the switch 424 of the time relay 412 interrupts the controlling brake circuit as described above, whereby the electromagnet 672 is deenergized, so that the triple pole torque motor switch S is opened and the torque motor 772 is switched off for a release of the brakes.

As shown in Fig. 4, the electrical control system for the beamer is also equipped with an electrical brake becoming effective in addition to the mechanical brakes of the beamer actuated by the torque motor. For this purpose an adjustable dynamic braking resistor 684 is connected with the junction points 686 and 688 in the lines 362 and 372 of the main motor circuit by means of a dynamic resistor circuit 690 including a dynamic resistor switch 692 of a dynamic resistor relay 694. The electromagnet 696 of said relay 694 is arranged in parallel to the electromagnet 434 of the brake control relay 432 by means of lines 698. Therefore, the electromagnet 696 is excited and the dynamic resistor switch 692 controlled by said electromagnet is open as long as the motor start holding circuit is closed and the electromotor 4600 drives the beam. As soon as the motor start holding circuit is interrupted in any of above described manners and the electromagnet 434 of the brake control relay 432 and the electromagnet 696 of the dynamic resistor relay 694 are deenergized, the dynamic resistor switch 692 is closed and shorts the electromotor 4600 through the dynamic braking resistor 684, whereby an additional braking of the rotating mass of the beam connected with the electromotor 4600 is obtained.

As best shown in Fig. 3, the beamer 700 is supported by rollers 798 secured to longitudinal shafts 800 journalled in suitable bearings on each side of the frame. A reversible motor 4800 is connected with the shafts 800 by means of a chain drive 802 for moving the beamer sidewise in one direction or the other, so that the beamer may be easily placed in registry with different creels arranged parallel to each other. According to Fig. 4, the electrical connections of the reversible motor 4800 with the circuits of the control system are the same as that of the reversible motor 480 of the storage device according to Fig. 2. The reversible motor 4800 of the beamer is controlled by a reversing switch 4960 mounted on the frame of the beamer.

I have described preferred embodiments of my invention, but, of course, numerous changes and omissions may be made without departing from the spirit of my invention.

Although preferably the individual objects of the invention are applied to an electrical control system for textile machines in the combination described, the individual objects of the invention may be applied individually or in partial combination to electrical control systems for textile machines. It is emphasized that the merits of the invention are not limited to the described and illustrated combination, but the individual objects of the invention per se also have inventive merits.

What I claim is:

1. In an electrical control system for the operation of braking means of a warping or beaming plant, the combination of a source of current, an electromotor for driving a beam, a motor circuit for connecting the source of current with said electromotor, at least one circuit opening switch for causing an interruption of said motor circuit, an electrical actuating device for the operation of the braking means, a brake circuit including said electrical actuating device, and an electrical control responsive to an interruption of said motor circuit for changing the electrical condition of said brake circuit so as to cause an actuation of said electrical actuating device for an actuation of the braking means.

2. In an electrical control system for the operation of braking means of a warping or beaming plant, the combination of a source of current, an electromotor for driving a beam, a motor circuit for connecting the source of current with said electromotor, at least one circuit opening switch for causing an interruption of said motor circuit, electromagnetic means for the operation of the braking means, a brake circuit including said electromagnetic means, and an electrical control responsive to an interruption of said motor circuit for closing said brake circuit so as to excite said electromagnetic means for an actuation of the braking means.

3. In an electrical control system for the operation of braking means of a warping or beaming plant, the combination of a source of current, an electromotor for driving a beam, a motor circuit for connecting the source of current with said electromotor, at least one circuit opening switch for causing an interruption of said motor circuit, an electrical actuating device for the operation of the braking means, a brake circuit including said electrical actuating device, an electrical control responsive to an interruption of said motor circuit for changing the electrical condition of said brake circuit so as to cause an actuation of said electrical actuating device for an actuation of the braking means, and a time relay responsive to an interruption of the motor circuit for causing at least a substantial reduction in the output of said electrical actuating device after a period of time determined by the delaying action of the time relay.

4. In an electrical control system for the operation of braking means of a warping or beaming plant, the combination of a source of current, an electromotor for driving a beam, a motor circuit for connecting the source of current with said electromotor, at least one circuit opening switch for causing an interruption of said motor circuit, electromagnetic means for the operation of the braking means, a brake circuit including said electromagnetic means, an electrical control responsive to an interruption of said motor circuit for closing said brake circuit so as to excite said electromagnetic means, and a time relay responsive to an interruption of the motor circuit for causing at least a substantial reduction in the energization of said electromagnetic means after a period of time determined by the delaying action of the time relay.

5. In an electrical control system for the operation of braking means of a warping or beaming plant, the combination of a source of current, an electromotor for driving a beam, a motor circuit for connecting the source of current with said electromotor, at least one circuit opening switch for causing an interruption of said motor circuit, an electrical actuating device for the operation of the braking means, a brake control switch, a time delay switch, a brake circuit, said electrical actuating device said brake control switch and said time delay switch being arranged in series in said brake circuit, a first electrical control responsive to an interruption of said motor circuit and associated with said brake control switch for closing said brake circuit by said brake control switch, and a second electrical control including a time relay responsive to an interruption of said motor circuit and associated with said time delay switch for opening said brake circuit by said time delay switch after a period of time determined by the delaying action of the time relay.

6. In an electrical control system for the operation of braking means of a warping or beaming plant, the combination of a source of current, an electromotor for driving a beam, a motor circuit for connecting the source of current with said electromotor, at least one circuit opening switch for causing an interruption of said motor circuit, an electrical actuating device for the operation of the braking means, a brake control switch, a time delay switch, a brake circuit, said electrical actuating device said brake control switch and said time delay switch being arranged in series in said brake circuit, an adjustable choke coil arranged in parallel with said time delay switch, a first electrical control responsive to an interruption of said motor circuit and associated with said brake control switch for closing said brake circuit by said brake control switch, and a second electrical control including a time relay responsive to an interruption of said motor circuit and associated with said time delay switch for opening said brake circuit by said time delay switch after a period of time determined by the delaying action of the time relay.

7. In an electrical control system for the operation of braking means of a warping or beaming plant, the combination of a source of current, an electromotor for driving a beam, a main motor circuit for connecting the source of current with said electromotor, a main switch arranged in said main motor circuit, a motor start circuit, a start switch, a trip coil magnet associated with said main switch for closing said main motor circuit upon an energization of said trip coil magnet, said start switch and said trip coil magnet being arranged in said motor start circuit, a motor start holding circuit connected in parallel with said start switch, at least one circuit opening switch arranged in said motor start holding circuit for interrupting said main motor circuit by deenergizing said trip coil magnet, an electrical actuating device for the operation of the braking means, a brake control switch, a brake circuit, said electrical actuating device and said brake control switch being arranged in series in said brake circuit, and a brake control relay connected in parallel with said trip coil magnet and associated with said brake control switch for closing said brake circuit by said brake control switch upon an interruption of said motor start circuit.

8. In an electrical control system for the operation of braking means of a warping or beaming plant, the combination of a source of current, an electromotor for driving a beam, a main motor circuit for connecting the source of current with said electromotor, a main switch arranged in said main motor circuit, a motor start circuit, a start switch, a trip coil magnet associated with said main switch for closing said main motor circuit upon an energization of said trip coil magnet, said start switch and said trip coil magnet being arranged in said motor start circuit, a motor start holding circuit connected in parallel with said start switch, at least one circuit opening switch arranged in said motor start holding circuit for interrupting said main motor circuit by deenergizing said trip coil magnet, an electrical actuating device for the operation of the braking means, a brake control switch, a time delay switch, a brake circuit, said electrical actuating device said brake control switch and said time delay switch being arranged in series in said brake circuit, a brake control relay connected in parallel with said trip coil magnet and associated with said brake control switch for closing said brake circuit by said brake control switch upon an interruption of said motor start circuit, and a time relay arranged in said motor start holding circuit in series with said circuit opening switch, said time relay being associated with said time delay switch for opening same upon an interruption of said motor start holding circuit after a period of time determined by the delaying action of the time relay.

9. In an electrical control system for the operation of braking means of a warping or beaming plant, the combination of a source of current, an electromotor for driving a beam, a main motor circuit for connecting the source of current with said electromotor, a main switch arranged in said main motor circuit, a motor start circuit, a start switch, a trip coil magnet associated with said main switch for closing said main motor circuit upon an energization of said trip coil magnet, said start switch and said trip coil magnet being arranged in said motor start circuit, a motor start holding circuit connected in parallel with said start switch, at least one circuit opening switch arranged in said motor start holding circuit for interrupting said main motor circuit by deenergizing said trip coil magnet, an electrical actuating device for the operation of the braking means, a brake control switch, a time delay switch, a brake circuit, said electrical actuating device said brake control switch and said time delay switch being arranged in series in said brake circuit, an adjustable choke coil arranged in parallel with said time delay switch, a brake control relay connected in parallel with said trip coil magnet and associated with said brake control switch for closing said brake circuit by said brake control switch upon an interruption of said motor start circuit, and a time relay arranged in said motor start holding circuit in series with said circuit opening switch, said time relay being associated with said time delay switch for opening same upon an interruption of said motor start holding circuit after a period of time determined by the delaying action of the time relay.

10. In an electrical control system for the operation of braking means of a warping or beaming plant including a creel with control needles responsive to yarn breakage, the combination of a source of current, an electromotor for driving a beam, a motor circuit for connecting the source of current with said electromotor, a circuit opening switch arranged for causing an interruption of said motor circuit, a first electrical control responsive to an actuation of a control needle upon yarn breakage for opening said circuit opening switch, an electrical actuating device for the operation of the braking means, a brake circuit including said electrical actuating device, and a second electrical control responsive to an interruption of said motor circuit for changing the electrical condition of said brake circuit so as to cause an actuation of said electrical actuating device for an actuation of the braking means.

11. In an electrical control system for the operation of braking means of a warping or beaming plant including a creel with control needles responsive to yarn breakage, the combination of a source of current, an electromotor for driving a beam, a main motor circuit for connecting the source of current with said electromotor, a main switch arranged in said main motor circuit, a motor start circuit, a start switch, a trip coil magnet associated with said main switch for closing said main motor circuit upon an energization of said trip coil magnet, said start switch and said trip coil magnet being arranged in said motor start circuit, a motor start holding circuit connected in parallel with said start switch, a manual stop switch and a circuit opening switch arranged in said motor start holding circuit for interrupting said main motor circuit by deenergizing said trip coil magnet, an electrical control responsive to an actuation of a control needle upon yarn breakage for opening said circuit opening switch, an electrical actuating device for the operation of the braking means, a brake control switch, a brake circuit, said electrical actuating device and said brake control switch being arranged in series in said brake circuit, and a brake control relay connected in parallel with said trip coil magnet and associated with said brake control switch for closing said brake circuit by said brake control switch upon an interruption of said motor start circuit.

12. In an electrical control system for the operation of braking means of a warping or beaming plant including a creel with control needles responsive to yarn breakage, the combination of a source of current, an electromotor for driving a beam, a motor circuit for connecting the source of current with said electromotor, a circuit opening switch arranged for causing an interruption of said motor circuit, a first electrical control responsive to an actuation of a control needle upon yarn breakage for opening said circuit opening switch, an electrical actuating device for the operation of the braking means, a brake circuit including said electrical actuating device, a second electrical control responsive to an interruption of said motor circuit for changing the electrical condition of said brake circuit so as to cause an actuation of said electrical actuating device for an actuation of the braking means, and a time relay responsive to an interruption of the motor circuit for causing at least a substantial reduction in the output of said electrical actuating device after a period of time determined by the delaying action of the time relay.

13. In an electrical control system for the operation of braking means of a warping or beaming plant including a creel with control needles responsive to yarn breakage, the combination of a source of current, an electromotor for driving a beam, a motor circuit for connecting the source of current with said electromotor, a circuit opening switch arranged for causing an interruption of said motor circuit, a first electrical control responsive to an actuation of a control needle upon yarn breakage for opening said circuit opening switch, an electrical actuating device for the operation of the braking means, a brake control switch, a time delay switch, a brake circuit, said electrical actuating device said brake control switch and said time delay switch being arranged in series in said brake circuit, a second electrical control responsive to an interruption of said motor circuit and associated with said brake control switch for closing said brake circuit by said brake control switch, and a third electrical control including a time relay responsive to an interruption of said motor circuit and associated with said time delay switch for opening said brake circuit by said time delay switch after a period of time determined by the delaying action of the time relay.

14. In an electrical control system for the operation of braking means of a warping or beaming plant including a creel with control needles responsive to yarn breakage, the combination of a source of current, an electromotor for driving a beam, a main motor circuit for connecting the source of current with said electromotor, a main switch arranged in said main motor circuit, a motor start circuit, a start switch, a trip coil magnet associated with said main switch for closing said main motor circuit upon an energization of said trip coil magnet, said start switch and said trip coil magnet being arranged in said motor start circuit, a motor start holding circuit connected in parallel with said start switch, a manual stop switch and a circuit opening switch arranged in said motor start holding circuit for interrupting said main motor circuit by deenergizing said trip coil magnet, an electrical control responsive to an actuation of a control needle upon yarn breakage for opening said circuit opening switch, an electrical actuating device for the operation of the braking means, a brake control switch, a time delay switch, a brake circuit, said electrical actuating device said brake control switch and said time delay switch being arranged in series in said brake circuit, a brake control relay connected in parallel with said trip coil magnet and associated with said brake control switch for closing said brake circuit by said brake control switch upon an interruption of said motor start circuit, and a time relay arranged in said motor start holding circuit in series with said circuit opening switch, said time relay being associated with said time delay switch for opening same upon an interruption of said motor start holding circuit after a period of time determined by the delaying action of the time relay.

15. In an electrical control system for the operation of braking means of a warping or beaming plant including a creel with control needles responsive to yarn breakage, the combination of a source of current, an electromotor for driving a beam, a motor circuit for connecting the source of current with said electromotor, a first circuit opening switch and a second opening switch arranged for causing an interruption of said motor circuit, a first electrical control responsive to an actuation of a control needle upon yarn breakage for opening said first circuit opening switch, a second electrical control responsive to the length of warp wound on the beam for opening said second circuit opening switch after the warping of a predetermined length of warp, an electrical actuating device for the operation of the braking means, a brake circuit including said electrical actuating device, and a third electrical control responsive to an interruption of said motor circuit for changing the electrical condition of said brake circuit so as to cause an actuation of said electrical actuating device for an actuation of the braking means.

16. In an electrical control system for the operation of braking means of a warping or beaming plant including a creel with control needles responsive to yarn breakage, the combination of a source of current, an electromotor for driving a beam, a main motor circuit for connecting the source of current with said electromotor, a main switch arranged in said main motor circuit, a motor start circuit, a start switch, a trip coil magnet associated with said main switch for closing said main motor circuit upon an energization of said trip coil magnet, said start switch and said trip coil magnet being arranged in said motor start circuit, a motor start holding circuit connected in parallel with said start switch, a manual stop switch, a first circuit opening switch and a second circuit opening switch arranged in series in said motor start holding circuit for interrupting said main motor circuit by deenergizing said trip coil magnet, a first electrical control responsive to an actuation of a control needle upon yarn breakage for opening said first circuit opening switch, a second electrical control responsive to the length of warp wound on the beam for opening said second circuit opening switch after the warping of a predetermined length of warp, an electrical actuating device for the operation of the braking means, a brake control switch, a brake circuit, said electrical actuating device and said brake control switch being arranged in series in said brake circuit, and a brake control relay connected in parallel with said trip coil magnet and associated with said brake control switch for closing said brake circuit by said brake control switch upon an interruption of said motor start circuit.

17. In an electrical control system for the operation of braking means of a warping or beaming plant including a creel with control needles responsive to yarn breakage, the combination of a source of current, an electromotor for driving a beam, a motor circuit for connecting the source of current with said electromotor, a first circuit opening switch and a second opening switch arranged for causing an interruption of said motor circuit, a first electrical control responsive to an actuation of a control needle upon yarn breakage for opening said first circuit opening switch, a second electrical control responsive to the length of warp wound on the beam for opening said second circuit opening switch after the warping of a predetermined length of warp, an electrical actuating device for the operation of the braking means, a brake circuit including said electrical actuating device, a third electrical control responsive to an interruption of said motor circuit for changing the electrical condition of said brake circuit so as to cause an actuation of said electrical actuating device for an actuation of the braking means, and a time relay responsive to an interruption of the motor circuit for causing at least a substantial reduction in the output of said electrical actuating device after a period of time determined by the delaying action of the time relay.

18. In an electrical control system for the operation of braking means of a warping or beaming plant including a creel with control needles responsive to yarn breakage, the combination of a source of current, an electromotor for driving a beam, a motor circuit for connecting the source of current with said electromotor, a first circuit opening switch and a second opening switch arranged for causing an interruption of said motor circuit, a first electrical control responsive to an actuation of a control needle upon yarn breakage for opening said first circuit opening switch, a second electrical control responsive to the length of warp wound on the beam for opening said second circuit opening switch after the warping of a predetermined length of warp, an electrical actuating device for the operation of the braking means, a brake control switch, a time delay switch, a brake circuit, said electrical actuating device said brake control switch and said time delay switch being arranged in series in said brake circuit, a third electrical control responsive to an interruption of said motor circuit and associated with said brake control switch for closing said brake circuit by said brake control switch, and a fourth electrical control including a time relay responsive to an interruption of said motor circuit and associated with said time delay switch for opening said brake circuit by said time delay switch after a period of time determined by the delaying action of the time relay.

19. In an electrical control system for the operation of braking means of a warping or beaming plant including a creel with control needles responsive to yarn breakage, the combination of a source of current, an electromotor for driving a beam, a main motor circuit for connecting the source of current with said electromotor, a main switch arranged in said main motor circuit, a motor start circuit, a start switch, a trip coil magnet associated with said main switch for closing said main motor circuit upon an energization of said trip coil magnet, said start switch and said trip coil magnet being arranged in said motor start circuit, a motor start holding circuit connected in parallel with said start switch, a manual stop switch a first circuit opening switch and a second circuit opening switch arranged in series in said motor start holding circuit for interrupting said main motor circuit by deenergizing said trip coil magnet, a first electrical control responsive to an actuation of a control needle upon yarn breakage for opening said first circuit opening switch, a second electrical control responsive to the length of warp wound on the beam for opening said second circuit opening switch after the warping of a predetermined length of warp, an electrical actuating device for the operation of the braking means, a brake control switch, a time delay switch, a brake circuit, said electrical actuating device said brake control switch and said time delay switch being arranged in series in said brake circuit, a brake control relay connected in parallel with said trip coil magnet and associated with said brake control switch for closing said brake circuit by said brake control switch upon an interruption of said motor start circuit, and a time relay arranged in said motor start holding circuit in series with said circuit opening switches, said time relay being associated with said time delay switch for opening same upon an interruption of said motor start holding circuit after a period of time determined by the delaying action of the time relay.

20. In an electrical control system for the operation of braking means of a warping or beaming plant, the combination of a source of current, an electromotor for driving a beam, a motor circuit for connecting the source of current with said electromotor, at least one circuit opening switch for causing an interruption of said motor circuit, a torque motor for the operation of the braking means, a torque motor brake circuit including said torque motor, and an electrical control responsive to an interruption of said motor circuit for closing said torque motor brake circuit.

21. In an electrical control system for the operation of braking means of a warping or beaming plant, the combination of a source of current, an electromotor for driving a beam, a motor circuit for connecting the source of current with said electromotor, at least one circuit opening switch for causing an interruption of said motor circuit, a torque motor for the operation of the braking means, an automatically adjustable resistor, a torque motor brake circuit including said torque motor and said automatically adjustable resistor, said adjustable resistor being responsive to the building up of the winding on the beam for varying the output of the torque motor in dependence on said building up of the winding, and an electrical control responsive to an interruption of said motor circuit for closing said torque motor brake circuit.

22. In an electrical control system for the operation of braking means of a warping or beaming plant, the combination of a source of current, an electromotor for driving a beam, a motor circuit for connecting the source of current with said electromotor, at least one circuit opening switch for causing an interruption of said motor circuit, a torque motor for the operation of the braking means, a torque motor brake circuit including said torque motor, a first electrical control responsive to an interruption of said motor circuit for closing said torque motor brake circuit, and a second electrical control including a time relay responsive to an interruption of the motor circuit for interrupting said torque motor brake circuit after a period of time determined by the delaying action of the time relay.

23. In an electrical control system for the operation of braking means of a warping or beaming plant, the combination of a source of current, an electromotor for driving a beam, a motor circuit for connecting the source of current with said electromotor, at least one circuit opening switch for causing an interruption of said motor circuit, a torque motor for the operation of the braking means, a torque motor switch, a torque motor brake circuit including said torque motor and said torque motor switch, a torque motor relay associated with said torque motor switch, a brake control switch, a brake circuit, said torque motor relay and said brake control switch being arranged in series in said brake circuit, and a brake control relay associated with said brake control switch, said brake control relay being responsive to an interruption of said motor circuit for closing said brake circuit by said brake control switch upon such an interruption so as to close said torque motor brake circuit by said torque motor switch controlled by said torque motor relay.

24. An electrical control system as claimed in claim 23 comprising an automatically adjustable resistor arranged in said torque motor brake circuit in series with said torque motor switch, said automatically adjustable resistor being responsive to the building up of the winding on the beam for varying the output of the torque motor in dependence on said building up of the winding.

25. An electrical control system as claimed in claim 23 comprising a time relay responsive to an interruption of the motor circuit for interrupting said torque motor brake circuit after a period of time determined by the delaying action of the time relay.

26. An electrical control system as claimed in claim 23 comprising an automatically adjustable resistor arranged in said torque motor brake circuit in series with said torque motor switch, said automatically adjustable resistor being responsive to the building up of the winding on the beam for varying the output of the torque motor in dependence on said building up of the winding, and a time relay responsive to an interruption of the motor circuit for interrupting said torque motor brake circuit after a period of time determined by the delaying action of the time relay.

27. In an electrical control system for the operation of braking means of a warping or beaming plant, the combination of a source of current, an electromotor for driving a beam, a main motor circuit for connecting the source of current with said electromotor, a main switch arranged in said main motor circuit, a motor start circuit, a start switch, a trip coil magnet associated with said main switch for closing said main motor circuit upon an energization of said trip coil magnet, said start switch and said trip coil magnet being arranged in said motor start circuit, a motor start holding circuit connected in parallel with said start switch, at least one circuit opening switch arranged in said motor start holding circuit for interrupting said main motor circuit by deenergizing said trip coil magnet, a torque motor for the operation of the braking means, a torque motor switch, a torque motor brake circuit including said torque motor and said torque motor switch, a torque motor relay associated with said torque motor switch, a brake control switch, a brake circuit, said torque motor relay and said brake control switch being arranged in series in said brake circuit, and a brake control relay connected in parallel with said trip coil magnet and associated with said brake control switch for closing said brake circuit by said brake control switch upon an interruption of said motor start circuit so as to close said torque motor brake circuit by said torque motor switch controlled by said torque motor relay.

28. An electrical control system as claimed in claim 15 comprising an automatically adjustable resistor arranged in said torque motor brake circuit in series with said torque motor switch, said automatically adjustable resistor being responsive to the building up of the winding on the beam for varying the output of the torque motor in dependence on said biulding up of the winding.

29. In an electrical control system for the operation of braking means of a warping or beaming plant, the combination of a source of current, an electromotor for driving a beam, a main motor circuit for connecting the source of current with said electromotor, a main switch arranged in said main motor circuit, a motor start circuit, a start switch, a trip coil magnet associated with said main switch for closing said main motor circuit upon an energization of said trip coil magnet, said start switch and said trip coil magnet being arranged in said motor start circuit, a motor start holding circuit connected in parallel with said start switch, at least one circuit opening switch arranged in said motor start holding circuit for interrupting said main motor circuit by deenergizing said trip coil magnet, a torque motor for the operation of the braking means, a torque motor switch, a torque motor brake circuit including said torque motor and said torque motor switch, a torque motor relay associated with said torque motor switch, a brake control switch, a time delay switch, a brake circuit, said torque motor relay said brake control switch and said time delay switch being arranged in series in said brake circuit, a brake control relay connected in parallel with said trip coil magnet and associated with said brake control switch for closing said brake circuit by said brake control switch upon an interruption of said motor start circuit so as to close said torque motor brake circuit by said torque motor switch controlled by said torque motor relay, and a time relay arranged in said motor start holding circuit in series with said circuit opening switch, said time relay being associated with said time delay switch for opening same upon an interruption of said motor start holding circuit after a period of time determined by the delaying action of the time relay so as to interrupt said torque motor brake circuit by said torque motor switch controlled by said torque motor relay.

30. An electrical control system as claimed in claim 29 comprising an automatically adjustable resistor arranged in said torque motor brake circuit in series with said torque motor switch, said automatically adjustable resistor being responsive to the building up of the winding on the beam for varying the output of the torque motor in dependence on said building up of the winding.

31. In an electrical control system for the operation of braking means of a warping or beaming plant, the combination of a source of current, an electromotor for driving a beam, a motor circuit for connecting the source of current with said electromotor, at least one circuit opening switch for causing an interruption of said motor circuit, a dynamic braking resistor, a dynamic resistor switch, a dynamic resistor circuit including said dynamic braking resistor and said dynamic resistor switch, said dynamic resistor circuit connecting said dynamic braking resistor in parallel with said electromotor, and an electrical control responsive to an interruption of said motor circuit for closing said dynamic resistor circuit by said dynamic resistor switch.

32. In an electrical control system for the operation of braking means of a warping or beaming plant, the combination of a source of current, an electromotor for driving a beam, a motor circuit for connecting the source of current with said electromotor, at least one circuit opening switch for causing an interruption of said motor circuit, a torque motor for the operation of the braking means, a torque motor brake circuit including said torque motor, a dynamic braking resistor, a dynamic resistor switch, a dynamic resistor circuit including said dynamic braking resistor and said dynamic resistor switch, said dynamic resistor circuit connecting said dynamic braking resistor in parallel with said electromotor, a first electrical control responsive to an interruption of said motor circuit for closing said torque motor brake circuit, and a second electrical control responsive to an interruption of said motor circuit for closing said dynamic resistor circuit by said dynamic resistor switch.

33. In an electrical control system for the operation of braking means of a warping or beaming plant, the combination of a source of current, an electromotor for driving a beam, a motor circuit for connecting the source of current with said electromotor, at least one circuit opening switch for causing an interruption of said motor circuit, a torque motor for the operation of the braking means, a torque motor brake circuit including said torque motor, a dynamic braking resistor, a dynamic resistor switch, a dynamic resistor circuit including said dynamic braking resistor and said dynamic resistor switch, said dynamic resistor circuit connecting said dynamic braking resistor in parallel with said electromotor, a first electrical control responsive to an interruption of said motor circuit for closing said torque motor brake circuit, a second electrical control responsive to an interruption of said motor circuit for closing said dynamic resistor circuit by said dynamic resistor switch, and a third electrical control including a time relay responsive to an interruption of the motor circuit for interrupting said torque motor brake circuit after a period of time determined by the delaying action of the time relay.

34. In an electrical control system for the operation of braking means of a warping or beaming plant, the combination of a source of current, an electromotor for driving a beam, a main motor circuit for connecting the source of current with said electromotor, a main switch arranged in said main motor circuit, a motor start circuit, a start switch, a trip coil magnet associated with said main switch for closing said main motor circuit upon an energization of said trip coil magnet, said start switch and said trip coil magnet being arranged in said motor start circuit, a motor start holding circuit connected in parallel with said start switch, at least one circuit opening switch arranged in said motor start holding circuit for interrupting said main motor circuit by deenergizing said trip coil magnet, a torque motor for the operation of the braking means, a torque motor switch, a torque motor brake circuit including said torque motor and said torque motor switch, a torque motor relay associated with said torque motor switch, a brake control switch, a brake circuit, said torque motor relay and said brake control switch being arranged in series in said brake circuit, a dynamic braking resistor, a dynamic resistor switch, a dynamic resistor circuit including said dynamic braking resistor and said dynamic resistor switch, said dynamic resistor circuit connecting said dynamic braking resistor in parallel with said electromotor, a brake control relay connected in parallel with said trip coil magnet and associated with said brake control switch for closing said brake circuit by said brake control switch upon an interruption of said motor start circuit so as to close said torque motor brake circuit by said torque motor switch controlled by said torque motor relay, and a dynamic resistor relay connected in parallel with said trip coil magnet and associated with said dynamic resistor switch for closing said dynamic resistor circuit by said dynamic resistor switch upon an interruption of said motor start circuit.

35. In an electrical control system for the operation of braking means of a warping or beaming plant, the combination of a source of current, an electromotor for driving a beam, a main motor circuit for connecting the source of current with said electromotor, a main switch arranged in said main motor circuit, a motor start circuit, a start switch, a trip coil magnet associated with said main switch for closing said main motor circuit upon an energization of said trip coil magnet, said start switch and said trip coil magnet being arranged in said motor start circuit, a motor start holding circuit connected in parallel with said start switch at least one circuit opening switch arranged in said motor start holding circuit for interrupting said main motor circuit by deenergizing said trip coil magnet, a torque motor for the operation of the braking means, a torque motor switch, a torque motor brake circuit including said torque motor and said torque motor switch, a torque motor relay associated with said torque motor switch, a brake control switch, a time delay switch, a brake circuit, said torque motor relay said brake control switch and said time delay switch being arranged in series in said brake circuit, a dynamic braking resistor, a dynamic resistor switch, a dynamic resistor circuit including said dynamic braking resistor and said dynamic resistor switch, said dynamic resistor circuit connecting said dynamic braking resistor in parallel with said electromotor, a brake control relay connected in parallel with said trip coil magnet and associated with said brake control switch for closing said brake circuit by said brake control switch upon an interruption of said motor start circuit so as to close said torque motor brake circuit by said torque motor switch controlled by said torque motor relay, a dynamic resistor relay connected in parallel with said trip coil magnet and associated with said dynamic resistor switch for closing said dynamic resistor circuit by said dynamic resistor switch upon an interruption of said motor start circuit, and a time relay arranged in said motor start holding circuit in series with said circuit opening switch, said time relay being associated with said time delay switch for opening same upon an interruption of said motor start holding circuit after a period of time determined by the delaying action of the time relay so as to interrupt said torque motor brake circuit by said torque motor switch controlled by said torque motor relay.

36. An electrical control system as claimed in claim 35 comprising an automatically adjustable resistor arranged in said torque motor brake circuit in series with said torque motor switch, said automatically adjustable resistor being responsive to the building up of the winding on the beam for varying the output of the torque motor in dependence on said building up of the winding.

FRITZ LAMBACH.